United States Patent
Lin

[11] Patent Number: 5,964,302
[45] Date of Patent: Oct. 12, 1999

[54] FILTER REGULATOR FOR A PNEUMATIC TOOL

[76] Inventor: Hsin-Nan Lin, 4Fl., No. 6, Lane 199, Hsiang Yang Rd., Tapei, Taiwan

[21] Appl. No.: 09/164,086

[22] Filed: Sep. 30, 1998

[51] Int. Cl.$^6$ .................................................. B23B 45/04
[52] U.S. Cl. .......................... 173/169; 173/168; 173/218
[58] Field of Search .................................. 173/168, 169, 173/170, 177, 218, 216

[56] References Cited

U.S. PATENT DOCUMENTS

| | | | |
|---|---|---|---|
| 4,243,111 | 1/1981 | Willoughby et al. | 173/169 |
| 4,721,166 | 1/1988 | Clapp et al. | 173/177 |
| 4,778,015 | 10/1988 | Jacobsson | 173/170 |
| 5,377,769 | 1/1995 | Hasuo et al. | 173/169 |
| 5,417,294 | 5/1995 | Suher | 173/168 |
| 5,531,279 | 7/1996 | Biek | 173/178 |

*Primary Examiner*—Scott A. Smith
*Attorney, Agent, or Firm*—Pro-Techtor International Services

[57] ABSTRACT

The present invention is to offer a filter/regulator for pneumatic tool, comprising a pipe with two end openings capable of respectively of jointing the air outlet of air compressor and the intake port of pneumatic tool, a filter core in the pipe, a fixing member to fix the filter core in the pipe, and a rotatable regulating knob with a through hole to pass through a lateral shaft hole on the pipe; based on the foregoing structure of filter/regulator, the filter core in the pipe can filter the oil, moisture and other heterogenities in the air and prevent the said foreign matter and heterogeneities from invading into the pneumatic tool and assure the life and quality of using the pneumatic tool, and the regulating knob can regulate the volume of air flow according to the user's requirement.

4 Claims, 2 Drawing Sheets

FILTER REGULATOR FOR A PNEUMATIC TOOL

FIELD OF THE INVENTION

The present invention is related to a filter/regulator for pneumatic tool which can effectively filter the oil, moisture and other heterogeneities in the air from an air compressor, assure the life and quality of using the pneumatic tool and regulate the air flow through a simple structure.

DESCRIPTION OF THE PRIOR ART

As shown in FIG. 1, so far as the pneumatic tools 1 in general such as spray gun, automatic grinder, etc. are concerned, the strong compressed air from an air compressor 2 drives the power mechanism of pneumatic tool so as to achieve the expected purpose of using the pneumatic tool. However, the air inevitably will contain some oil, moisture and other heterogeneities which will unfavorably affect the life and quality of using pneumatic tool if they invade into the pneumatic tool. For instance, the said heterogeneities will shorten the life of using a spray gun and lead to a deficit of unevenly spraying liquid. Therefore, as a more careful practice, a filter is installed between a pneumatic tool 1 and an air outlet 21 of the air compressor 2, to wit, a filter is provided in the position of an intake port of the pneumatic tool 1 so as to filter the foreign matter and heterogeneity in the air and prevent the foreign matter and heterogeneity from invading into the pneumatic tool 1. Nevertheless, the structure of filter in general is rather complex and the manufacturing cost thereof is rather high, and separately manufacturing the filter in general and the regulator of pneumatic tool (capable of controlling the volume of air flow) further increases the cost and trouble of their manufacture and assembly, that is why the present inventor invents the present invention.

SUMMARY OF THE INVENTION

The filter/regulator for pneumatic tool according to the present invention comprises a pipe with two end openings to respectively joint the air outlet of air compressor and the intake port of pneumatic tool, a filter core in the pipe, a fixing member to fix the filter core in the pipe, and a rotatable regulating knob with a through hole to pass through a lateral shaft hole which is provided on the pipe; based on the foregoing structure of filter/regulator, the filter core in the pipe can filter the oil, moisture and other heterogeneities in the air to prevent the foreign matter and heterogeneities from invading into the pneumatic tool, assure the life and quality of using the pneumatic tool and regulate the volume of air flow through the regulating knob according to the user's requirement.

DETAILED DESCRIPTION OF THE PREFERRED EMBODIMENT

Figure 1:
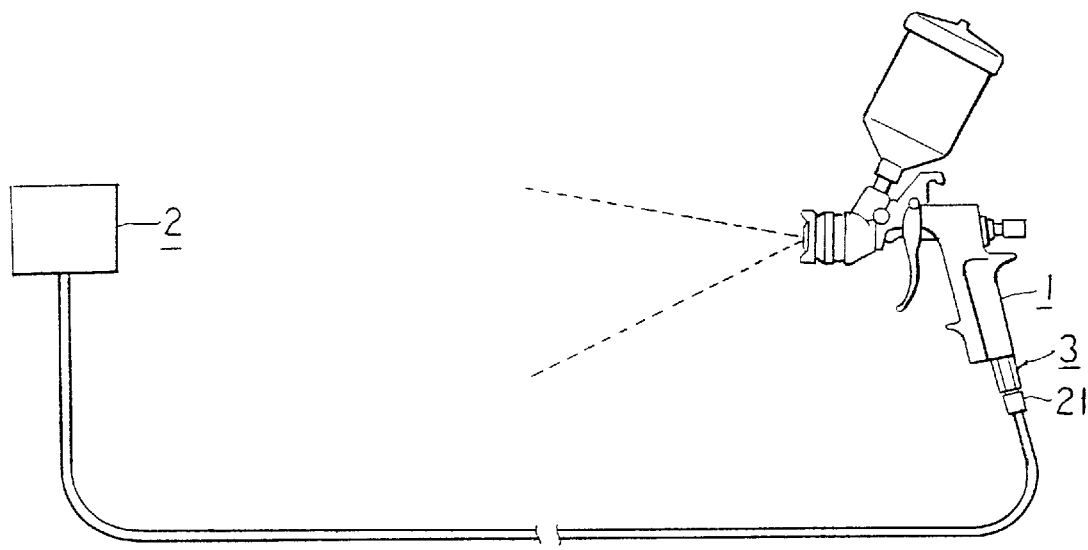
FIG. 1 is an optional view of using the present invention.
Figure 2:
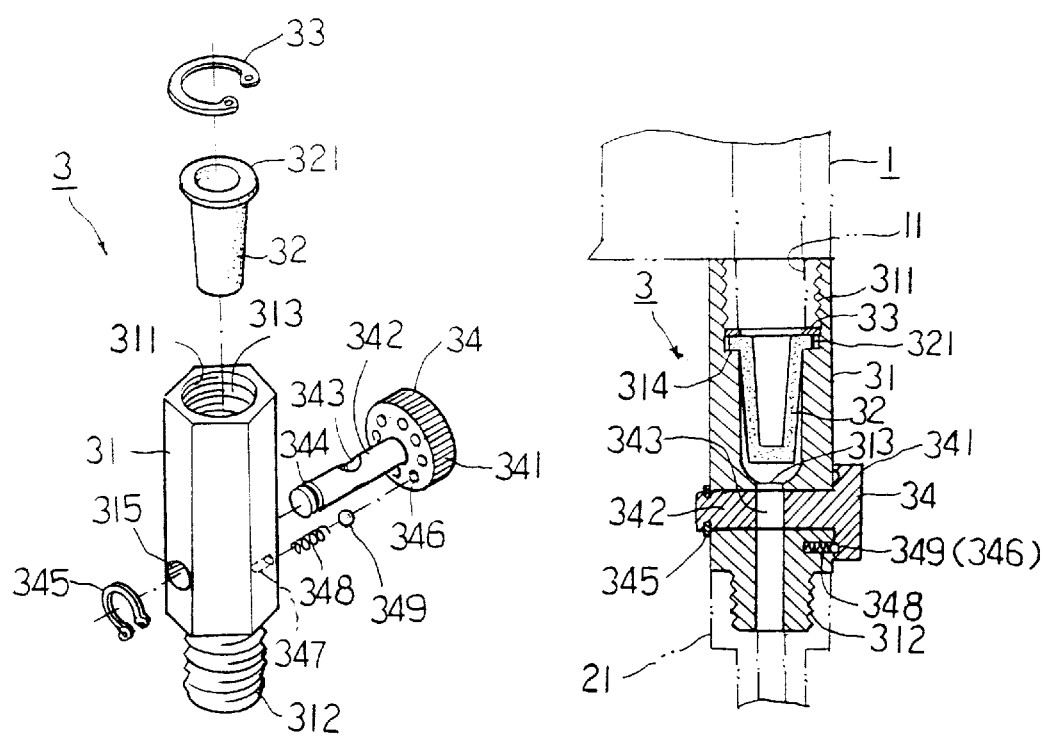
FIG. 2 is a breakdown view of the present invention.
Figure 3:
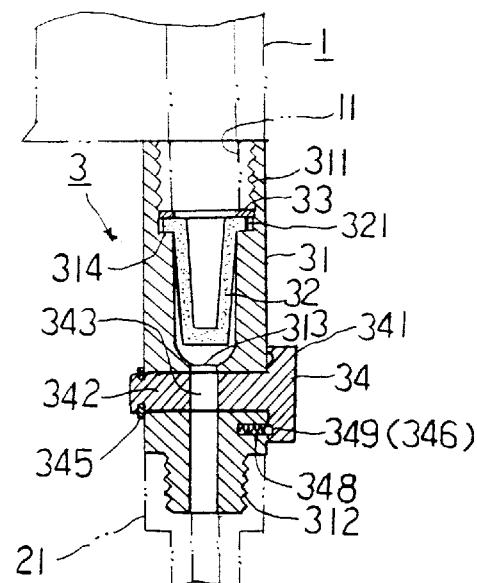
FIG. 3 is an assembly sectional view of the present invention.

The structure, characteristics and functions of the present invention can be best described in detail in conjunction with the accompanying drawings of examples as follows:

As shown in the drawings, the filter/regulator 3 for pneumatic tool according to the present invention comprises a pipe 31, a filter core 32, a fixing member 33 and a regulating knob 34.

The two end openings of the pipe 31 are thread ably provided with female thread 311 and male thread 312 respectively to joint an intake port 11 of a pneumatic tool 1 and an air outlet 21 of an air compressor 2, an axial pipe hole 313 at the center of pipe 31 is an air through hole, a shoulder 314 formed in a suitable position on the pipe hole 313 in the pipe 31 is to support a flange 321 of the filter core 32, and a lateral shaft hole 315 is provided on the pipe 31 to contain the regulating knob 34 and to vertically communicate with the axial pipe hole 313.

The filter core 32 is roughly round or conic and made of powdered metalwork or high density polyethylene, a flange 312 is provided on the outward ring at the top of filter core 32 which can be installed in the pipe hole 313 of the pipe 31, and the shoulder 314 of the pipe 31 supports the flange 321.

The said fixing member 33 is installed in the pipe hole 313 of the pipe 31 and disposed on the top surface of the flange 321 of the filter core 321 and can be disposed in the pipe hole 313 of the pipe 31 through a C-ring elasticity of inward contraction and outward expansion and to contact the inner wall of the pipe 31 so as to relatively fix the filter core 32 through a property of naturally outward expansion thereof, to wit, the bottom surface of the flange 321 of the filter core 32 is prevented by the shoulder 314 of the pipe 31, the top surface thereof is pressed by the fixing member 33, and in other word, the flange 321 of filter core 32 is jointly clamped and fixed by the fixing member 33 and the shoulder 314 of the pipe 31, so that the filter core 32 is firmly fixed in the pipe hole 313 of the pipe 31.

The said regulating knob 34 comprises a wheel 341 and a shaft 342, wherein the wheel 341 is formed at one end of the shaft 342, a vertical through hole 343 is provided roughly at the center of the shaft 342, a concave neck 344 is provided at another end of the shaft 342; the shaft 344 of regulating knob 34 passes through a lateral shaft hole 315 on the pipe 31 and extends out of the pipe 31, and a C-ring 345 is applied over the neck 344. In addition, a plurality of equidistant positioning holes 346 annularly arranged are provided on the inner wall of the wheel 341 of the regulating knob 34, a groove 347 corresponding to one of these positioning holes 346 is provided on the pipe 31, a spring 348 and a positioning ball 349 are disposed in the groove 347, so when rotating the wheel 341 of the regulating knob 34 to change the intersection angle of both the through hole 343 on the shaft 342 and the positioning ball 349, the positioning relation between a certain positioning hole 346 and the positioning ball 349 can be maintained from time to time.

When to use the present invention, the two end openings of the pipe 31 of the filter 3 are threadably jointed to the intake port 11 of pneumatic tool 1 and the air outlet 21 of air compressor 2 respectively, and during use, the filter core 32 of the filter 33 can effectively filter the oil, moisture and other heterogeneities in the air from the air compressor 2 so as to prevent the foreign matter and heterogeneities from invading into the pneumatic tool 1.

Figure 4:
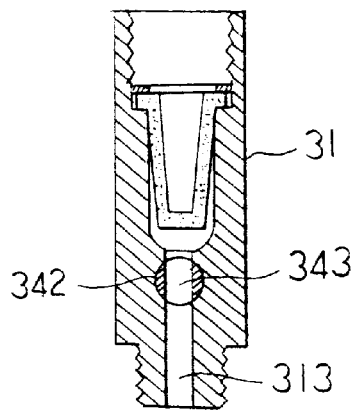
FIG. 4 is another sectional view of the present invention to show the through hole of regulating knob in a full open state.
Figure 5:
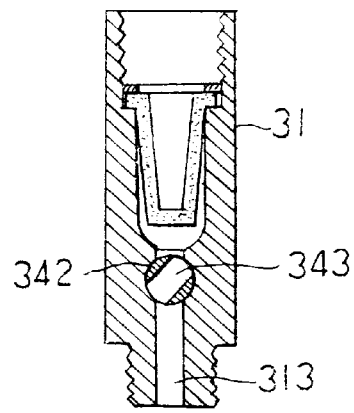
FIG. 5 is another sectional view of the present invention to show the through hole of regulating knob in a half open state.
Figure 6:
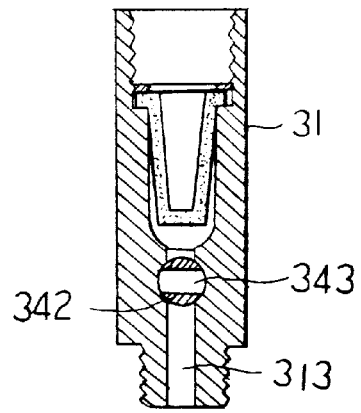
FIG. 6 is another sectional view of the present invention to show the through hole of regulating knob in a closed state.

Furthermore, to rotate the wheel 341 of the regulating knob 34 can actuate the shaft 342 turning to change the intersection angle of both the through hole 343 on the shaft 342 and the pipe hole 313 of the pipe 31 and to further regulate the volume of air flow in the pipe 31. For instance, as shown in FIG. 4, the through hole 343 and the pipe hole 313 fully align each other, the through hole 343 is fully open, all the air in the pipe 31 can pass through the aligned through hole 313, so the air flow is maximum; as shown in FIG. 5, the through hole 343 and the pipe hole 313 partially communicate with each other, the through hole 343 is half open, only a portion of air can pass through there, so the air flow is less; and as shown in FIG. 6, the through 343 is rotated to be lateral and fully block the pipe hole 313, the through hole 343 is closed, the air in the pipe 31 is blocked by the shaft 342 and impossible to pass through there, the air therein is in a closed state. Moreover, when rotating the regulating knob 34 to regulate the air flow volume and in each one regulating state, a certain positioning hole 346 of the wheel 341 of the regulating knob 34 will catch the positioning ball 349 in place so as to keep the full open, half open or closed state as regulated respectively.

The filter/regulator for pneumatic tool according to the present invention can improve the drawbacks of complex structure of the conventional filter, shoot the trouble and inconvenience of respectively manufacturing and assembling the conventional filter and regulator and lower the cost thereof.

I claim:

1. A filter/regulator for a pneumatic tool, comprising:

a pipe, of which two end openings are respectively provided with a female thread and a male thread, an axial pipe hole is provided at a center thereof, a shoulder is formed on said pipe hole in said pipe and a lateral shaft hole is provided on said pipe to communicate with said pipe hole;

a filter core disposed in said pipe hole of said pipe, a flange is provided on an outward ring on a top edge thereof to be supported by said shoulder of said pipe;

a fixing member, disposed in said pipe hole of said pipe and on a top surface of said flange of said filter core which is jointly clamped and fixed by both said fixing member and said shoulder of said pipe so as to fix said filter core in said pipe; and a regulating knob, comprising a shaft and a wheel at one end of said shaft, a vertical through hole is at a center of said shaft, a neck is provided at another end thereof and when said shaft passes through said lateral shaft hole of said pipe and extends out of said pipe, a C-ring is applied over said neck; and a plurality of equidistant positioning holes annularly arranged are provided on an inner wall of said wheel, a groove corresponding to one of said positioning holes is provided on said pipe to contain a spring and a positioning ball, and said positioning ball is secured in one of said positioning holes to hold said wheel in place.

2. The filter/regulator for a pneumatic tool as claimed in claim 1, wherein said filter core is made of powdered metalwork.

3. The filter/regulator for a pneumatic tool as claimed in claim 1, wherein said filter core is made of high density polyethylene.

4. The filter/regulator for a pneumatic tool as claimed in claim 1, wherein said fixing member is a C-ring fixing member.

* * * * *